(12) United States Patent
Iwaguchi et al.

(10) Patent No.: US 10,241,262 B2
(45) Date of Patent: Mar. 26, 2019

(54) OPTICAL FIBER

(71) Applicant: SUMITOMO ELECTRIC INDUSTRIES, LTD., Osaka-shi, Osaka (JP)

(72) Inventors: Noriaki Iwaguchi, Yokohama (JP); Masuo Iida, Osaka (JP); Takashi Fujii, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/521,699

(22) PCT Filed: Oct. 14, 2016

(86) PCT No.: PCT/JP2016/080536
§ 371 (c)(1),
(2) Date: Apr. 25, 2017

(87) PCT Pub. No.: WO2017/065274
PCT Pub. Date: Apr. 20, 2017

(65) Prior Publication Data
US 2017/0242187 A1 Aug. 24, 2017

(30) Foreign Application Priority Data
Oct. 14, 2015 (JP) ................. 2015-202665

(51) Int. Cl.
*G02B 6/036* (2006.01)
*G02B 6/028* (2006.01)
(Continued)

(52) U.S. Cl.
CPC ...... *G02B 6/02395* (2013.01); *C03C 25/1065* (2013.01); *C03C 25/24* (2013.01); *G02B 6/4403* (2013.01)

(58) Field of Classification Search
CPC .............. G02B 6/02395; G02B 6/0283; C03C 25/1065
(Continued)

(56) References Cited

U.S. PATENT DOCUMENTS 9,411,115 B2 * 8/2016 Tanaka ..................... G02B 6/44
2003/0077059 A1 * 4/2003 Chien ................... C03C 25/106
385/128
(Continued)

FOREIGN PATENT DOCUMENTS

JP H06-242355 A 9/1994
JP 2002-504959 2/2002
(Continued)

*Primary Examiner* — Kaveh C Kianni
*Assistant Examiner* — Hung Lam
(74) *Attorney, Agent, or Firm* — Drinker Biddle & Reath LLP

(57) ABSTRACT

An optical fiber includes a glass fiber and a coating resin layer with which the glass fiber is covered, wherein the coating resin layer includes tin and a cured ultraviolet curable resin composition containing 2,4,6-trimethylbenzoyldiphenyl phosphine as a photoinitiator, a percentage of uncured components having a molecular weight of 1000 or less included in the coating resin layer is 15% by mass or less, and a fraction of an amount of a phosphorus-tin complex with respect to an amount of hydrocarbon on the surface of coating resin layer is 1000 ppm or less.

9 Claims, 2 Drawing Sheets

(51) Int. Cl.
  *G02B 6/00*     (2006.01)
  *G02B 6/02*     (2006.01)
  *C03C 25/24*    (2018.01)
  *C03C 25/1065*  (2018.01)
  *G02B 6/44*     (2006.01)

(58) Field of Classification Search
  USPC .......................................... 385/124, 128, 141
  See application file for complete search history.

(56) References Cited

U.S. PATENT DOCUMENTS

2015/0050000 A2* 2/2015 Cattron ............... C03C 25/1065
                                                      385/128
2015/0131956 A1   5/2015 Iwaguchi et al.

FOREIGN PATENT DOCUMENTS

| JP | 2002-274896 | 9/2002 |
| JP | 2002-277700 | 9/2002 |
| JP | 2003-519277 | 6/2003 |
| JP | 2004-045828 | 2/2004 |
| JP | 2005-121772 | 5/2005 |
| WO | WO 98/057902 | 12/1998 |
| WO | WO 01/049792 | 7/2001 |
| WO | WO 02/075419 | 9/2002 |
| WO | WO-2014/168201 A1 | 10/2014 |

* cited by examiner

OPTICAL FIBER

TECHNICAL FIELD

The present invention relates to an optical fiber.

This application claims priority to Japanese Patent Application No. 2015-202665, filed on Oct. 14, 2015, the disclosure of which is incorporated herein by reference in its entirety.

BACKGROUND ART

In general, an optical fiber has a thin colored layer called an ink layer as the outermost layer for identifying an optical fiber consisting of a glass fiber and a coating resin layer with which the glass fiber is covered (see, for example, Patent Literature 1).

The coating resin layer needs to have sufficient curability for protecting the glass fiber and preventing transmission loss of the optical fiber. For example, reducing the content of tin included in the coating resin layer has been studied in Patent Literature 2, in order that both of microbend resistance and low-temperature properties are satisfied.

CITATION LIST

Patent Literature

[Patent Literature 1] JP H6-242355 A
[Patent Literature 2] WO 2014-168201 A

SUMMARY OF INVENTION

In order to solve the above problem, an optical fiber according to one embodiment of the present invention comprises a glass fiber and a coating resin layer with which the glass fiber is covered, wherein the coating resin layer includes tin and a cured ultraviolet curable resin composition containing 2,4,6-trimethylbenzoyldiphenyl phosphine as a photoinitiator, a percentage of uncured components having a molecular weight of 1000 or less included in the coating resin layer is 15% by mass or less, and a fraction of an amount of a phosphorus-tin complex with respect to an amount of hydrocarbon on a surface of coating resin layer is 1000 ppm or less.

DESCRIPTION OF EMBODIMENTS

[Technical Problem]

Figure 1:
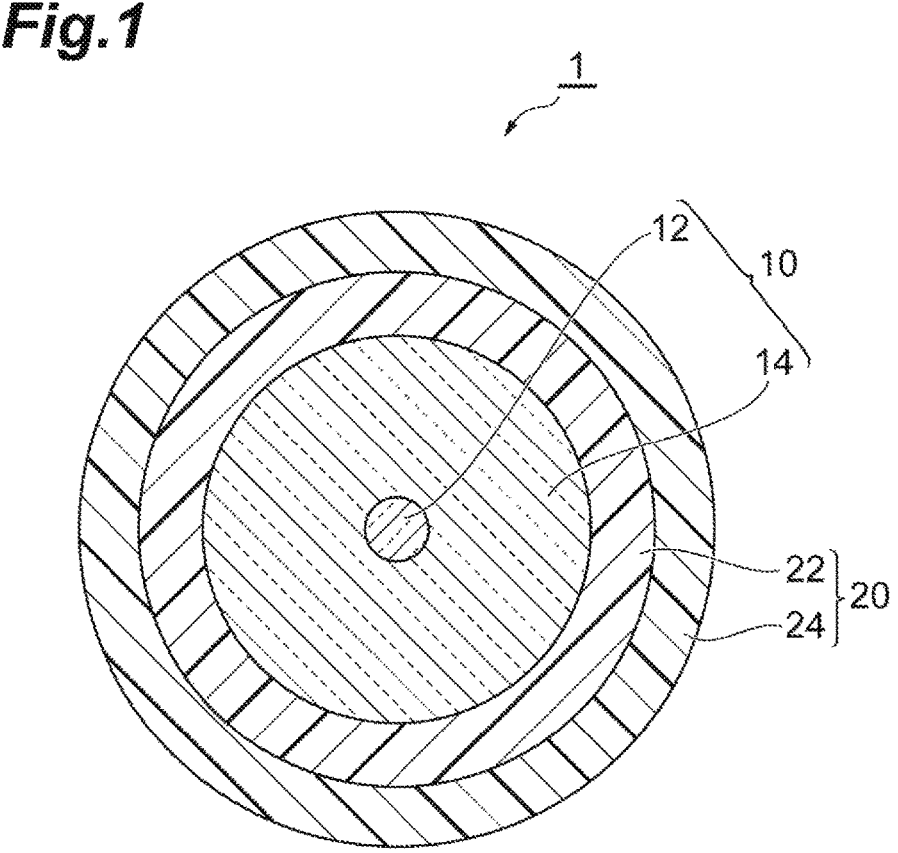
FIG. 1 is a cross-sectional view illustrating one example of an optical fiber according to the present embodiment.

Optical fibers may be sometimes used in the form of an optical fiber ribbon in which a plurality of optical fibers are arranged in parallel and are covered with a ribbon material. In an operation for removal of the ribbon material from the optical fibers and taking out of the optical fiber ribbon, color peeling in which the ink layer peels off from the coating resin layer may occur.

Therefore, it is an object of the present disclosure to provide an optical fiber including a coating resin layer that has sufficient curability and is excellent in adhesion to an ink layer.

[Advantageous Effects of Disclosure]

According to the present disclosure, it is possible to provide an optical fiber including a coating resin layer that has sufficient curability and is excellent in adhesion to an ink layer.

[Description of Embodiments of the Present Invention]

First, the content of embodiments of the present invention is recited and described. The optical fiber according to one embodiment of the present invention includes a glass fiber and a coating resin layer with which the glass fiber is covered, wherein the coating resin layer includes tin and a cured ultraviolet curable resin composition containing 2,4,6-trimethylbenzoyldiphenyl phosphine as a photoinitiator, a percentage of uncured components having a molecular weight of 1000 or less included in the coating resin layer is 15% by mass or less, and a fraction of an amount of a phosphorus-tin complex with respect to an amount of hydrocarbon on a surface of the coating resin layer is 1000 ppm or less.

In order to increase the curability of the coating resin layer, it is effective to use 2,4,6-trimethylbenzoyldiphenyl phosphine (hereinafter, abbreviated as "TPO") that is a phosphorus photoinitiator. On the other hand, when a large amount of TPO is compounded into the ultraviolet curable resin composition, TPO may be unevenly distributed on the surface of the coating resin layer.

Further, a tin (Sn) catalyst is generally known, for example, as a synthetic catalyst of urethane and may be incorporated into a resin component (such as urethane oligomer) constituting the ultraviolet curable resin composition used for forming the coating resin layer Tin forms a complex with phosphorus (P—Sn complex) and may be unevenly distributed on the surface of the coating resin layer. When the P—Sn complex is unevenly distributed on the surface of the coating resin layer, the adhesion at the interface between the coating resin layer and the ink layer when producing the optical fiber ribbon is reduced, and color peeling easily occurs in single fiber separation. Therefore, in order to suppress the uneven distribution of the P—Sn complex, the compounding amount of TPO needs to be reduced, but when the compounding amount of TPO is reduced, the curability of the coating resin layer will also be reduced.

In contrast, the optical fiber of the present embodiment can satisfy both the curability and the adhesion of the coating resin layer by including phosphorus in the coating resin layer and reducing the fraction of the amount of the P—Sn complex with respect to the amount of hydrocarbon on the surface of the coating resin layer to 1000 ppm or less.

In the optical fiber, the percentage of uncured components having a molecular weight of 1000 or less included in the coating resin layer is 15% by mass or less, which can further increase the curability of the coating resin layer.

The coating resin layer may have a primary resin layer and a secondary resin layer, and the secondary resin layer may include a cured ultraviolet curable resin composition containing 25% by mass or more of a polyfunctional monomer having a bisphenol skeleton. With such a configuration, the uneven distribution of the phosphorus-tin complex is further reduced, and the coating resin layer is more excellent in adhesion to the ink layer.

The Young's modulus of the secondary resin layer may be 800 MPa or more at 23° C. This can improve the microbend resistance. Further, the Young's modulus of the secondary resin layer may be 900 MPa or more at 23° C. This can increase the rigidity of the optical fibers and thus can improve the workability in single fiber separation.

For allowing the optical fiber to have a mechanical strength, the coating resin layer needs to have a certain thickness, but the outer diameter of the optical fiber may be usually 260 μm or less. Further, in view of multi-coreization of an optical cable, the outer diameter of the optical fiber may be also 210 μm or less.

[Detail of Embodiments of the Present Invention]

Specific examples of an optical fiber according to an embodiment of the present invention and a production method thereof are described below with reference to the drawings. It is herein intended that the present invention is not limited to such examples, is represented by the claims, and encompasses all modifications within the meaning and the scope equivalent to the claims. In the following description, the same element is represented by the same symbol in the description of the drawings, and overlapping description is omitted.

(Optical Fiber)

FIG. 1 is a cross-sectional view illustrating one example of an optical fiber 1 according to the present embodiment. As illustrated in FIG. 1, the optical fiber 1 of the present embodiment comprises a glass fiber 10 that is an optical transmitter and a coating resin layer 20.

The glass fiber 10 has a core 12 and a cladding 14, and consists of a glass member, for example, $SiO_2$ glass. The glass fiber 10 transmits light introduced to the optical fiber 1. The core 12 is provided in, for example, a region including the center axial line of the glass fiber 10. The core 12 includes pure $SiO_2$ glass, or may additionally include $GeO_2$, a fluorine element, or the like. The cladding 14 is provided in a region surrounding the core 12. The cladding 14 has a refractive index lower than the refractive index of the core 12. The cladding 14 may include pure $SiO_2$ glass, or may include $SiO_2$ glass to which a fluorine element is added.

The diameter of the glass fiber 10 is usually about 125 μm. The total thickness of the coating resin layer 20 is about 60 to 70 μm but may be smaller. It is desirable that the total thickness of the coating resin layer 20 be 32.5 μm or more. The total thickness of the coating resin layer 20 is preferably 32.5 to 65 μm, may be 62.5 μm or less, may be 60 μm or less, or may be 42.5 μm or less.

For allowing the optical fiber to have a mechanical strength, the coating resin layer needs to have a certain thickness, and therefore the outer diameter of the optical fiber 1 may be usually 260 μm or less. The outer diameter of the optical fiber 1 may be 190 to 255 μm and is preferably 245 μm. In view of the multi-coreization of the optical cable, the outer diameter of the optical fiber 1 may be 210 μm or less and is preferably 200 μm or less and 180 μm or more.

The coating resin layer 20 has a primary resin layer 22 that is the first layer in contact with the glass fiber, and a secondary resin layer 24 that is the second layer in contact with the first layer.

The thickness of the primary resin layer 22 is usually about 15 to 40 μm and may be 20 to 40 μm. The thickness of the secondary resin layer 24 is usually about 15 to 45 μm.

The Young's modulus of the primary resin layer 22 is preferably 1 MPa or less at 23° C., more preferably 0.8 MPa or less, further preferably 0.4 MPa or less. The lower limit of the Young's modulus of the primary resin layer 22 is not particularly limited, and is about 0.05 MPa. The Young's modulus of the secondary resin layer 24 is preferably 800 MPa or more at 23° C. and may be 800 to 1000 MPa.

From the viewpoint of increasing the rigidity of the optical fiber and improving the workability in single fiber separation, the Young's modulus of the secondary resin layer 24 is preferably 800 MPa or more at 23° C., more preferably 900 MPa or more, and may be 900 to 1500 MPa.

The coating resin layer 20 can be formed by, for example, curing an ultraviolet curable resin composition including an oligomer, a monomer and a photopolymerization initiator.

Examples of the oligomer include urethane (meth)acrylates. The oligomer can be used as a mixture of two or more. The (meth)acrylate here means acrylate, or methacrylate corresponding thereto. Much the same is true on (meth) acrylic acid.

The urethane (meth)acrylates include those obtained by reacting a polyol compound, a polyisocyanate compound and a hydroxyl group-containing acrylate compound. Examples of the polyol compound include polytetramethylene glycol, polypropylene glycol and bisphenol A-ethylene oxide adduct diol. Examples of the polyisocyanate compound include 2,4-tolylene diisocyanate, 2,6-tolylene diisocyanate and isophorone diisocyanate. Examples of the hydroxyl group-containing acrylate compound include 2-hydroxy (meth)acrylate, 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate and tripropylene glycol di(meth)acrylate.

As the monomer, a monofunctional monomer having one polymerizable group or a polyfunctional monomer having two or more polymerizable groups can be used. The monomer can be used as a mixture of two or more.

Examples of the monofunctional monomer include N-vinyl monomers having a cyclic structure, such as N-vinylpyrrolidone, N-vinylcaprolactam and (meth)acryloylmorpholine; and (meth)acrylate compounds such as isobornyl (meth)acrylate, tricyclodecanyl (meth)acrylate, benzyl (meth)acrylate, dicyclopentanyl (meth)acrylate, 2-hydroxyethyl (meth)acrylate, nonylphenyl (meth)acrylate, phenoxyethyl (meth)acrylate and polypropylene glycol mono(meth)acrylate. Among them, an N-vinyl monomer having a cyclic structure is preferable from the viewpoint of an enhancement in curing speed.

Examples of the polyfunctional monomer include polyethylene glycol di(meth)acrylate, tricyclodecanediyl dimethylene di(meth)acrylate, trimethylolpropane tri(meth)acrylate, ethylene oxide or propylene oxide adduct diol di(meth)acrylate of bisphenol compounds, and epoxy (meth) acrylate obtained by adding di(meth)acrylate to glycidyl ether of bisphenol compounds.

Examples of the bisphenol compounds include bisphenol A, bisphenol AP, bisphenol B, bisphenol BP, bisphenol C and bisphenol E, and among them, bisphenol A is preferable. That is, a polyfunctional monomer having a bisphenol skeleton can be used as the polyfunctional monomer, and among them, it is preferable to use a polyfunctional monomer having a bisphenol A skeleton.

In particular, from the viewpoint of improving the adhesion to the ink layer, it is preferable that the secondary resin layer 24 include a cured ultraviolet curable resin composition containing 25% by mass or more of a polyfunctional monomer having a bisphenol skeleton based on the total amount of the ultraviolet curable resin composition for forming the secondary resin layer. It is more preferable that the ultraviolet curable resin composition contain 25 to 40% by mass of the polyfunctional monomer having a bisphenol skeleton, and further preferable that the composition contain 25 to 35% by mass of such a polyfunctional monomer.

From the viewpoint of satisfying both the curability and the adhesion of the coating resin layer, the ultraviolet curable resin composition forming the coating resin layer 20 contains 2,4,6-trimethylbenzoyldiphenyl phosphine (hereinafter, referred to as "TPO") as a photoinitiator. The content of TPO is adjusted to 0.5 to 2.0% by mass in the coating resin layer 20.

Together with the ultraviolet curable resin composition, known radical photopolymerization initiators other than TPO may be used in combination, within the range not inhibiting the effects of the present invention, and examples include an acyl phosphine oxide type initiators and an acetophenone type initiators.

Examples of the acyl phosphine oxide type initiators include 2,4,4-trimethylpentylphosphine oxide and 2,4,4-trimethylbenzoyl diphenylphosphinoxide.

Phosphorus derived from these initiators is included in the coating resin layer 20. The content of phosphorus can be determined by gas chromatograph mass spectrometry of an extraction liquid obtained by immersing a coating resin solution including the ultraviolet curable resin composition for forming the coating resin layer 20 in acetone at 40° C. for 16 hours.

Examples of the acetophenone type initiator include 1-hydroxycyclohexan-1-yl phenyl ketone (produced by BASF SE, trade name "Irgacure 184"), 2-hydroxy-2-methyl-1-phenyl-propan-1-one (produced by BASF SE, trade name "Darocure 1173"), 2,2-dimethoxy-1,2-diphenylethan-1-one (produced by BASF SE, trade name "Irgacure 651"), 2-methyl-1-(4-methylthiophenyl)-2-morpholinopropan-1-one (produced by BASF SE, trade name "Irgacure 907"), 2-benzyl-2-dimethylamino-1-(4-morpholinophenyl)-butanone-1 (produced by BASF SE, trade name "Irgacure 369"), 1-hydroxycyclohexyl phenyl ketone, 2,2-dimethoxy-2-phenylacetophenone and 1-(4-isopropylphenyl)-2-hydroxy-2-methylpropan-1-one.

From the viewpoint of reducing the color peeling of the ink layer from the coating resin layer, the fraction of the amount of the P—Sn complex with respect to the amount of hydrocarbon on the surface of the coating resin layer is 1000 ppm or less, but is preferably 950 ppm or less, more preferably 900 ppm or less. The lower limit of the fraction of the amount of the P—Sn complex with respect to the amount of hydrocarbon is not particularly limited, and is about 60 ppm. The fraction of the amount of the P—Sn complex with respect to the amount of hydrocarbon can be measured by analyzing the surface of the coating resin layer using TOF-SIMS.

It is preferable that the percentage of uncured components having a molecular weight of 1000 or less included in the coating resin layer 20 be 15% by mass or less, from the viewpoint of improving the curability of the coating resin layer. The uncured components having a molecular weight of 1000 or less can be determined from the molecular weight and the amount of an extract obtained by immersing the optical fiber in methyl ethyl ketone at 60° C. for 17 hours and measurement of the molecular weight using a gas chromatograph mass spectrometer.

As the method of forming the coating resin layer 20 on the glass fiber 10, a method that has been conventionally used for production of an optical fiber can be applied.

For example, the coating resin layer 20 is formed by coating the cladding 14 with an ultraviolet curable resin composition, and curing the ultraviolet curable resin composition by irradiation with ultraviolet light.

When the coating resin layer 20 has the primary resin layer 22 and the secondary resin layer 24, a system (wet-on-dry system) may be used in which the cladding 14 is coated with a resin composition for primary resin layer formation, the composition is cured by irradiation with ultraviolet light to form the primary resin layer 22, and thereafter the primary resin layer 22 is coated with a resin composition for secondary resin layer formation and the composition is cured by irradiation with ultraviolet light to form the secondary resin layer 24. Alternatively, a system (wet-on-wet system) may be used in which the cladding 14 is coated with a curable resin composition for primary resin layer formation and thereafter coated with a resin composition for secondary resin layer formation, and the compositions are simultaneously cured by irradiation with ultraviolet light to form the primary resin layer 22 and the secondary resin layer 24.

(Optical Fiber)

On the outer periphery surface of the secondary resin layer 24 constituting the coating resin layer 20, a colored layer 30 that serves as an ink layer can be formed for identification when a plurality of optical fibers are arranged for use in the form of an optical fiber ribbon. In the present embodiment, the form in which the colored layer 30 is formed on the optical fiber 1 is referred to as an optical fiber 2 (see FIG. 2).

The thickness of the colored layer is 3 µm or more, preferably 5 to 10 µm. When the thickness of the colored layer is 3 µm or more, it is possible to suppress the color peeling.

It is preferable that the colored layer contain a pigment from the viewpoint of an enhancement in distinguishability of the optical fiber. Examples of the pigment include coloring pigments such as carbon black, titanium oxide and zinc flower, magnetic powders such as $\gamma$-$Fe_2O_3$, a mixed crystal of $\gamma$-$Fe_2O_3$ and $\gamma$-$Fe_3O_4$, $CrO_2$, cobalt ferrite, iron oxide to which cobalt adheres, barium ferrite, Fe—Co and Fe—Co—Ni, and inorganic pigments such as MIO, zinc chromate, strontium chromate, aluminum tripolyphosphate, zinc, alumina, glass and mica. In addition, an organic pigment such as an azo type pigment, a phthalocyanine type pigment, or a dyeing lake pigment can also be used. The pigment may be subjected to various treatments such as surface modification and formation of a composite pigment.

The outer diameter of the optical fiber is usually about 245 to 265 µm but may be 245 µm or less. From the viewpoint of improving the mechanical strength of the optical fiber, it is preferable that the outer diameter of the optical fiber be 190 µm or more.

(Optical Fiber Ribbon)

Figure 2:
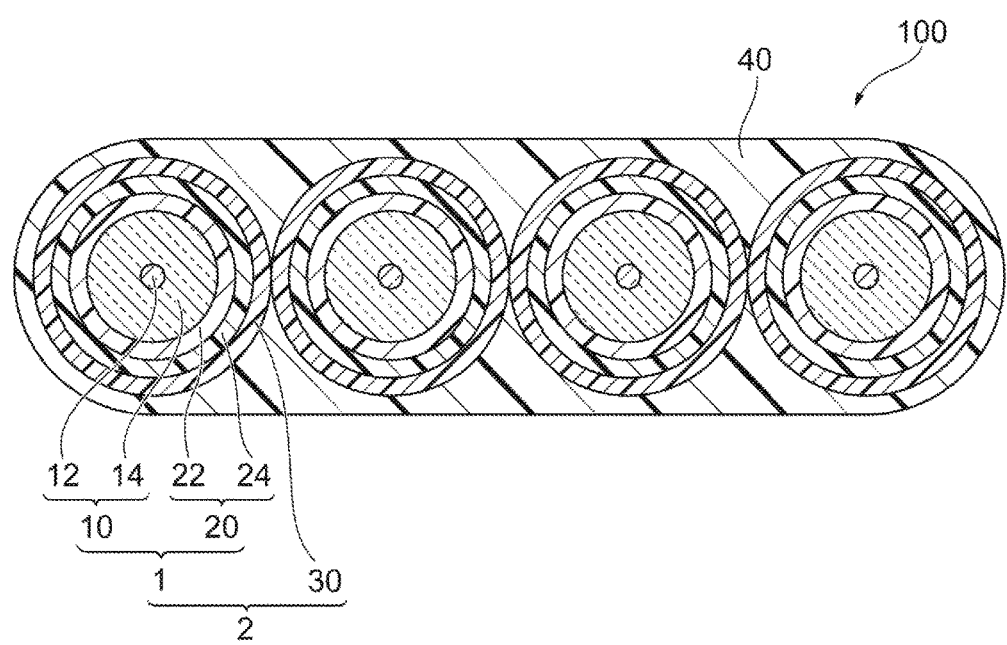
FIG. 2 is a cross-sectional view illustrating one example of an optical fiber ribbon according to the present embodiment.

The optical fiber of the present embodiment can be used to produce an optical fiber ribbon. FIG. 2 is a cross-sectional view of an optical fiber ribbon 100 according to the present embodiment. The optical fiber ribbon 100 illustrated in the same figure is one in which a plurality (4 in the case) of optical fiber 2 each in the form in which the colored layer 30 is formed on the outer periphery of the optical fiber 1 are arranged in parallel and integrated by a ribbon material 40. The ribbon material 40 is formed by, for example, an epoxy acrylate resin, a urethane acrylate resin or the like. Such an optical fiber ribbon can allow an increase in transmission loss under a low temperature environment to be reduced. In addition, the optical fiber ribbon can allow the optical fiber to be easily distinguished in an operation for removal of the ribbon material from the optical fiber ribbon and takeoff of the optical fiber, without the occurrence of any color peeling.

EXAMPLES

Next, the present invention is described in detail with reference to Examples, but the present invention is not limited to these Examples.

[Preparation of Resin Composition for Forming Primary Resin Layer]

Preparation Example 1

Resin composition A was prepared by mixing 65 parts by mass of urethane acrylate obtained by reacting diisocyanate and hydroxy acrylate with polypropylene glycol diol, 25 parts by mass of nonylphenyl acrylate, 10 parts by mass of N-vinylcaprolactam, and 1 part by mass of TPO (produced by BASF SE, trade name "Lucirin TPO").

[Preparation of Resin Composition for Forming Secondary Resin Layer]

Each resin composition for forming the secondary resin layer were prepared by mixing urethane acrylate obtained by reacting diisocyanate and hydroxy acrylate with polypropylene glycol diol, bisphenol epoxy acrylate, isobornyl acrylate, N-vinylcaprolactam, and TPO at the following ratio.

Preparation Example 2

While 10 parts by mass of isobornyl acrylate and 10 parts by mass of N-vinylcaprolactam were fixed, the compounding amount of urethane acrylate was adjusted so that bisphenol A epoxy acrylate included in the resin composition for forming the secondary resin layer be 25% by mass, and the compounding amount of TPO in the coating resin layer was further adjusted to 0.5% by mass, to obtain resin composition B1.

Preparation Example 3

While 10 parts by mass of isobornyl acrylate and 10 parts by mass of N-vinylcaprolactam were fixed, the compounding amount of urethane acrylate was adjusted so that epoxy acrylate having a bisphenol A skeleton included in the resin composition for forming the secondary resin layer be 45% by mass, and the compounding amount of TPO in the coating resin layer was further adjusted to 2.0% by mass, to obtain resin composition B2.

Preparation Example 4

While 10 parts by mass of isobornyl acrylate and 10 parts by mass of N-vinylcaprolactam were fixed, the compounding amount of urethane acrylate was adjusted so that epoxy acrylate having a bisphenol A skeleton included in the resin composition for forming the secondary resin layer be 30% by mass, and the compounding amount of TPO in the coating resin layer was further adjusted to 0.2% by mass, to obtain resin composition B3.

Preparation Example 5

While 10 parts by mass of isobornyl acrylate and 10 parts by mass of N-vinylcaprolactam were fixed, the compounding amount of urethane acrylate was adjusted so that epoxy acrylate having a bisphenol A skeleton included in the resin composition for forming the secondary resin layer be 10% by mass, and the compounding amount of TPO in the coating resin layer was further adjusted to 1.0% by mass, to obtain resin composition B4.

Preparation Example 6

The molecular weight of urethane acrylate in Preparation Example 3 was adjusted, to obtain resin composition B5 in which the Young's modulus of the secondary resin layer was 800 MPa at 23° C.

Preparation Example 7

The molecular weight of urethane acrylate in Preparation Example 3 was adjusted, to obtain resin composition B6 in which the Young's modulus of the secondary resin layer was 1000 MPa at 23° C.

Preparation Example 8

The compounding amount of TPO in the coating resin layer in Preparation Example 3 was changed to 0.5% by mass, to obtain resin composition B7.

[Preparation of Resin Composition for Forming Colored Layer]

Preparation Example 9

Resin composition C was prepared by mixing 70 parts by mass of urethane acrylate resin, 6 parts by mass of an organic pigment, 20 parts by mass of a mixture of bifunctional acrylate monomer and polyfunctional acrylate monomer (compounding ratio: 4/6), 3 parts by mass of Irgacure 907, 0.03 parts by mass of a phenolic antioxidant, 0.01 parts by mass of a sulfur antioxidant, 0.01 parts by mass of an amine-based polymerization inhibitor, and 0.1 parts by weight of silicone oil.

[Preparation of Resin Composition for Ribbon Material]

Resin composition D was prepared by mixing 18 parts by mass of urethane acrylate obtained by reacting 1 mol of bisphenol A-ethylene oxide adduct diol, 2 mol of tolylene diisocyanate and 2 mol of hydroxyethyl acrylate, 10 parts by mass of urethane acrylate obtained by reacting 1 mol of polytetramethylene glycol, 2 mol of tolylene diisocyanate and 2 mol of hydroxyethyl acrylate, 15 parts by mass of tricyclodecane diacrylate obtained by reacting 1 mol of tolylene diisocyanate and 2 mol of hydroxyethyl acrylate, 10 parts by mass of N-vinylpyrrolidone, 10 parts by mass of isobornyl acrylate, 5 parts by mass of bisphenol A-ethylene oxide adduct diol diacrylate, 0.7 parts by mass of 2-methyl-1-[4-(methylthio)phenyl]-2-morpholino-propan-1-one (produced by BASF SE, trade name "Irgacure 907"), and 1.3 parts by mass of TPO.

[Optical Fiber]

Example 1

A primary resin layer having a thickness of 35 µm was formed on the outer periphery of a glass fiber having a diameter of 125 µm, the fiber being configured from a core and a cladding, by use of resin composition A, and a secondary resin layer having a thickness of 25 µm was further formed on the outer periphery of the resultant by use of resin composition B1, to obtain an optical fiber having a diameter of 245 µm. The linear velocity was 1500 m/min.

Example 2

An optical fiber was obtained by the same operation as in Example 1 except that the secondary resin layer was formed by use of resin composition B2.

Example 3

A primary resin layer having a thickness of 17.5 μm was formed on the outer periphery of a glass fiber having a diameter of 125 μm, the fiber being configured from a core and a cladding, by use of resin composition A, and a secondary resin layer having a thickness of 17.5 μm was further formed on the outer periphery of the resultant by use of resin composition B5, to obtain an optical fiber having a diameter of 195 μm.

Example 4

An optical fiber was obtained by the same operation as in Example 3 except that the secondary resin layer was formed by use of resin composition B6.

Example 5

An optical fiber was obtained by the same operation as in Example 3 except that the secondary resin layer was formed by use of resin composition B7.

Comparative Example 1

An optical fiber was obtained by the same operation as in Example 1 except that the secondary resin layer was formed by use of resin composition B3.

Comparative Example 2

An optical fiber was obtained by the same operation as in Example 1 except that the secondary resin layer was formed by use of resin composition B4.

[Optical Fiber]

The optical fiber obtained in each of Examples and Comparative Examples was wound up once, and thereafter, while the optical fiber was anew unwound, an ink layer (colored layer) having a thickness of 5 μm was formed on the outer periphery of the secondary resin by use of resin composition C in a coloring machine, to thereby produce each optical fiber.

[Optical Fiber Ribbon]

Four optical fibers were arranged in parallel and integrated by covering their periphery with a ribbon material (resin composition D), to obtain an optical fiber ribbon.

[Evaluation]

(Amount of P—Sn Complex)

The surface of the secondary resin layer was analyzed by TOF-SIMS. The used device was TRIFT V nanoTOF, the ion type was Au+, and the acceleration voltage was 30 kV. Irradiation with ion beam was performed from the lateral side of the optical fiber for the measurement. The fraction of the amount of the P—Sn complex with respect to the amount of hydrocarbon was measured from the ratio (value of peak +337/value of peak +59) of the value of peak +337 (m/z) (indicating the amount of the phosphorus-tin complex) and the value of peak +59 (m/z) (indicating the amount of hydrocarbon). The results are shown in Table 1.

(Evaluation of Curability)

The curability of the coating resin layer was checked by extracting uncured components having a molecular weight of 1000 or less under the following conditions. That is, the optical fiber was immersed in methyl ethyl ketone at 60° C. for 17 hours, the amount of substances having a molecular weight of 1000 or less out of the obtained extract was determined using a gas chromatograph mass spectrometer, and the amount was divided by the weight of the coating resin layer of the optical fiber, to determine the percentage of components having a molecular weight of 1000 or less. The results are shown in Table 1. When the content of uncured components in the optical fiber was 15% by mass or less, the curability was evaluated as good, and when it was more than 15% by mass, the curability was evaluated as poor.

(Workability in Single Fiber Separation and Color Peeling Test)

The optical fiber ribbon separated into each single optical fiber by removing the ribbon material using a tool (TS-1/4, produced by Sumitomo Electric Industries, Ltd.). At this time, when color peeling did not occur (the colored layer was not peeled off together with the ribbon material), the adhesion was determined as "good", and when color peeling occurred, the adhesion was determined as "poor".

(Young's Modulus of Secondary Resin Layer)

The Young's modulus of the secondary resin layer was measured by pulling the glass portion out of the optical fiber and subjecting the coating resin layer to a tensile tester. The results are shown in Table 2.

(Workability in Single Fiber Separation)

The optical fibers were taken by single fiber separation from the optical fiber ribbon according to Telcordia GR-20 5.3.1. The presence of peeling of the ink layer (colored layer) was evaluated. In Table 2, a case where no peeling was observed was rated as "A", and a case where peeling was observed was rated as "B".

TABLE 1

| | Example 1 | Example 2 | Example 3 | Example 4 | Example 5 | Comparative Example 1 | Comparative Example 2 |
|---|---|---|---|---|---|---|---|
| Content of TPO (% by mass) | 0.5 | 2.0 | 2.0 | 2.0 | 0.5 | 0.2 | 1.0 |
| Amount of P—Sn complex/ Amount of hydrocarbon (ppm) | 200 | 900 | 900 | 900 | 60 | 20 | 1010 |

TABLE 1-continued

|  | Example 1 | Example 2 | Example 3 | Example 4 | Example 5 | Comparative Example 1 | Comparative Example 2 |
|---|---|---|---|---|---|---|---|
| Monomer having bisphenol A skeleton (% by mass) | 25 | 45 | 45 | 45 | 45 | 30 | 10 |
| Content of uncured components (% by mass) | 15 | 8 | 8 | 8 | 15 | 18 | 10 |
| Adhesion | good | good | good | good | good | good | poor |

TABLE 2

|  | Example 3 | Example 4 |
|---|---|---|
| Young's modulus of secondary resin layer (MPa) | 800 | 900 |
| Workability in single fiber separation | B | A |

It could be confirmed that, in the optical fibers produced in Examples, the coating resin layer had sufficient curability and was excellent in adhesion to the ink layer. Further, it could be confirmed that an increase in the Young's modulus of the secondary resin layer improved the workability in single fiber separation.

REFERENCE SIGNS LIST

1: optical fiber, 2: optical fiber, 10: glass fiber, 12: core, 14: cladding, 20: coating resin layer, 22: primary resin layer, 24: secondary resin layer, 30: colored layer, 40: ribbon material, and 100: optical fiber ribbon.

The invention claimed is:

1. An optical fiber comprising:
   a glass fiber and a coating resin layer with which the glass fiber is covered, wherein the coating resin layer has a primary resin layer and a secondary resin layer, the primary resin layer includes a cured ultraviolet curable resin composition containing 2,4,6-trimethylbenzoyldiphenyl phosphine as a photoinitiator, and
   the secondary resin layer includes tin and a cured ultraviolet curable resin composition containing 2,4,6-trimethylbenzoyldiphenyl phosphine as a photoinitiator,
   the content of 2,4,6-trimethylbenzoyldiphenyl phosphine is 0.5 to 2.0% by mass in the coating resin layer,
   a percentage of uncured components having a molecular weight of 1000 or less included in the coating resin layer is 15% by mass or less, and
   a fraction of an amount of a phosphorus-tin complex with respect to an amount of hydrocarbon on a surface of the coating resin layer is 1000 ppm or less, and
   a cured ultraviolet curable resin composition containing 25 to 45% by mass of a polyfunctional monomer having a bisphenol skeleton.

2. The optical fiber according to claim 1, wherein a Young's modulus of the secondary resin layer is 800 MPa or more at 23° C.

3. The optical fiber according to claim 1, wherein a Young's modulus of the secondary resin layer is 900 MPa or more at 23° C.

4. The optical fiber according to claim 1, having an outer diameter of 260 μm or less.

5. The optical fiber according to claim 1, having an outer diameter of 210 μm or less.

6. The optical fiber according to claim 2, having an outer diameter of 260 μm or less.

7. The optical fiber according to claim 3, having an outer diameter of 260 μm or less.

8. The optical fiber according to claim 2, having an outer diameter of 210 μm or less.

9. The optical fiber according to claim 3, having an outer diameter of 210 μm or less.

\* \* \* \* \*